Patented Apr. 28, 1942

2,280,863

UNITED STATES PATENT OFFICE

2,280,863

CELLULOSE ACETATE MOLDING COMPOSITION

Raphael L. Stern, South River, N. J., assignor to Hercules Powder Company, Wilmington, Del., a corporation of Delaware No Drawing. Application December 24, 1938, Serial No. 247,680

9 Claims. (Cl. 106—169)

This invention relates to an improved cellulose acetate molding composition and to methods of production thereof. It relates more particularly to a cellulose acetate molding composition which possesses improved color stability and to methods of producing such a composition.

Cellulose acetate, as produced commercially, exhibits a tendency to discolor when heated in the form of molding compositions to molding temperatures. It is the common belief that the cellulose acetate contains certain colored impurities or impurities which give rise to color on heating. Various methods have been proposed to improve the properties of cellulose acetate for use in molding compositions such as washing the cellulose acetate with acids, salts, etc., or treating with bleaching and oxidizing agents. These methods do not effectively remove the impurities and the cellulose acetate after the treatment still discolors in molding compositions to a considerable extent.

In the production of cellulose acetate and even in the after-treatments of cellulose acetate involving washing with acids, particular efforts are directed to the removal of free acidity in the finished ester. Free acidity is known to be undesirable, as it impairs the stability of the ester.

In accordance with this invention, it has been found that the color stability of cellulose acetate molding compositions can be greatly improved by judiciously adding an acid to the substantially neutral molding composition in an amount which is insufficient to deleteriously affect the stability of the cellulose acetate itself.

The exact mechanism by which the acid added improves the color stability of the cellulose acetate molding composition is not known. It is believed, however, that the discoloration normally encountered is a result of some degradation or change of certain impurities present in small amount in the cellulose acetate as produced commercially. It is further believed that the acid added minimizes or prevents this degradation or change by combining with the impurities to transform them into color stable derivatives.

The cellulose acetate which may be utilized in carrying out the invention may be of any of the grades suitable for use in molding plastics. These grades usually have an acetyl content within the range of about 52 to about 55 per cent by weight.

The process of this invention is applicable to any cellulose acetate molding composition including a heat-stable plasticizer or mixture of heat-stable plasticizers, i. e., plasticizers which do not themselves discolor when heated with cellulose acetate under molding conditions. Plasticizers which have been found to be useful are camphor, dimethyl phthalate, diethyl phthalate, diphenyl phthalate, ethyl phthalyl ethyl glycollate, tricresyl phosphate, tributyl phosphate, butyl tartrate, triacetin, ortho and para toluene sulfonamides, tripropionin, triethyl citrate, dimethoxy ethyl phthalate, methyl methoxy-ethyl phthalate, sorbitol hexa-acetate, light colored plasticizing resins, etc.

The cellulose acetate molding composition may contain a coloring agent such as a pigment or a dye. Addition of the acid to the molding composition containing the coloring agent increases the stability of the color during the molding operation, due, presumably, to the combination of the acid with the impurities present in the cellulose acetate. Clearer colors and greater ease of duplication of shades results. Any of the usual pigments or dyes customarily used in cellulose acetate plastics may be utilized.

The acid used in accordance with this invention may be any acid which will function in the manner described. Preferably the acid will be one which will presumably combine with the impurities present in cellulose acetate to form color stable derivatives, such as, for example, phosphoric acid, nitric acid, oxalic acid, citric acid, tartaric acid, lactic acid, etc.

The acid may be added in an amount within the range of about 0.002% to about 0.10% by weight based on the cellulose acetate, and preferably within the range of about 0.005% to about 0.015% by weight based on the cellulose acetate, such amounts producing the desirable features of the invention without exerting a deleterious effect on the cellulose acetate itself.

The stabilizing effect of the various acids utilizable in accordance with this invention appears to be related in some way to the strength of the acid and to the amount used. With the weaker acids the effect is obtained with a larger proportion of the acid. With the weaker acids, such as tartaric or citric, the amount of acid added may be above about 0.05 per cent by weight of the cellulose acetate, and may even reach 0.10 per cent. With stronger acids, however, such as phosphoric or nitric, smaller amounts than the above will give the optimum results. The preferable range with most of the acids to give the optimum result falls within the range of about 0.005 per cent to about 0.015 per cent by weight based on the cellulose acetate. The acid may be added in aqueous or organic solvent solution to the molding composition containing cellulose acetate, plasticizers, pigments or dyes, etc., either in the mixer, while being sheeted on the rolls or by treating the finished molding powder with a solution of the acid.

In carrying out the process of the invention, I may, for example, make a paste of cellulose acetate, plasticizer, solvent and pigment or dye, if such be included, in a suitable mixer, roll it into sheets on heated rolls, add the acid either as such or in solution thereto, and finally remove most of the solvent by rolling. Further amounts of solvent may be removed by subsequently heating chips of the rolled sheets to an elevated temperature. The plastic composition in granular or powdered form may then be molded in a heated press or may be injection molded. As alternative procedures to adding the acid on the rolls, I may add it to the molding composition in the mixer prior to rolling or may treat the finished molding powder with a solution of the acid. The desirable effect of addition of the acid may be obtained by addition of the acid at any point in the preparation of the molding composition prior to the molding operation itself.

As illustrative of the procedure for carrying out the invention the following examples are typical:

Example 1

A molding composition containing the following ingredients:

| | Parts by weight |
|---|---|
| Cellulose acetate | 250 |
| Dimethyl phthalate | 75 |
| Acetone | 75 |
| Alcohol | 75 | was mixed to a paste in a chrome plated mixer. The composition was then transferred to heated chrome plated rolls and 12.5 parts by weight of a one per cent by weight alcoholic solution of oxalic acid added. The composition was processed on the rolls until the solvent was substantially completely removed. The molding composition was then cut to granulations of about one-quarter inch size and molded under heat and pressure. The molded article was considerably paler in color than a comparable molded piece prepared with the same composition without the oxalic acid added.

Example 2

A sample of commercial cellulose acetate molding powder was spread out in a thin layer in a shallow receptacle and treated for one minute with a 0.5 per cent by weight alcoholic solution of phosphoric acid. The excess solution was then drained off and the molding powder redried at a temperature of about 60° C. On molding the treated powder a very pale straw color was obtained whereas molding of the untreated molding powder in the same manner produced a deep straw color.

Example 3

A molding composition containing the following ingredients:

| | Parts by weight |
|---|---|
| Cellulose acetate | 250 |
| Mixed commercial plasticizers | 135 |
| Acetone | 95 |
| Alcohol | 95 | was ground together in a mixer to give a paste. Then 6.5 parts by weight of a color solution containing 0.011% by weight of Milori Blue and 0.12% by weight of Purple Blue Lake were added to the paste in the mixer. Ten parts by weight of a 1% by weight solution of citric acid in acetone were added to the colored paste in the mixer. In molding of the composition under heat and pressure the color was stable and bright, whereas without the citric acid it was pale and discolored by the heating.

The paste produced in accordance with this invention may be used for the manufacture of sheets, rods, tubes or any molded article. Molded articles fabricated from the paste containing the acids in accordance with this invention are characterized by better colors than obtainable from paste not containing the acids.

It will be understood that the details and examples hereinbefore set forth are illustrative only, and that the invention as herein broadly described and claimed is in no way limited thereby.

Where, in the specification I refer to the acetyl content of cellulose acetate, I mean the acetyl value determined as acetic acid.

What I claim and desire to protect by Letters Patent is:

1. In the preparation of cellulose acetate molding compositions comprising cellulose acetate and plasticizer in colloided form, the improvement which consists in adding to the molding composition an acid in a quantity between about 0.002% and about 0.10% by weight of the cellulose acetate in the composition to obtain improved stability of the color of the composition at molding temperatures.

2. In the preparation of cellulose acetate molding composition comprising cellulose acetate, a plasticizer and a coloring agent in colloided form, the improvement which consists in adding to the molding composition an acid in a quantity between about 0.002% and about 0.10% by weight of the cellulose acetate in the composition to obtain improved stability of the color of the composition at molding temperatures.

3. In the preparation of cellulose acetate molding compositions comprising cellulose acetate and plasticizer in colloided form, the improvement which consists in adding to the molding composition phosphoric acid in a quantity between about 0.002% and about 0.10% by weight of the cellulose acetate in the composition to obtain improved stability of the color of the composition at molding temperatures.

4. In the preparation of cellulose acetate molding compositions comprising cellulose acetate and plasticizer in colloided form, the improvement which consists in adding to the molding composition nitric acid in a quantity between about 0.002% and about 0.10% by weight of the cellulose acetate in the composition to obtain improved stability of the color of the composition at molding temperatures.

5. In the preparation of cellulose acetate molding compositions comprising cellulose acetate and plasticizer in colloided form, the improvement which consists in adding to the molding composition oxalic acid in a quantity between about 0.002% and about 0.10% by weight of the cellulose acetate in the composition to obtain improved stability of the color of the composition at molding temperatures.

6. A cellulose acetate molding composition prepared by colloiding cellulose acetate normally having a tendency to discolor on heating at molding temperatures with plasticizer therefor and adding an acid to the composition in a quantity in the range between about 0.002% and 0.01% by weight of the cellulose acetate.

7. A cellulose acetate molding composition prepared by colloiding cellulose acetate normally having a tendency to discolor on heating at molding temperatures with plasticizer therefor and adding phosphoric acid to the composition in a quantity in the range between about 0.002% and 0.1% by weight of the cellulose acetate.

8. A celluloise acetate molding composition prepared by colloiding cellulose acetate normally having a tendency to discolor on heating at molding temperatures with plasticizer therefor and adding nitric acid to the composition in a quantity in the range between about 0.002% and 0.1% by weight of the cellulose acetate.

9. A cellulose acetate molding composition prepared by colloiding cellulose acetate normally having a tendency to discolor on heating at molding temperatures with plasticizer therefor and adding oxalic acid to the composition in a quantity in the range between about 0.002% and 0.1% by weight of the cellulose acetate.

RAPHAEL L. STERN.

CERTIFICATE OF CORRECTION.

Patent No. 2,280,863. April 28, 1942.

RAPHAEL L. STERN.

It is hereby certified that error appears in the printed specification of the above numbered patent requiring correction as follows: Page 3, first column, line 2, claim 6, for "0.01%" read --0.1%--; line 10, claim 8, for "celluloise" read --cellulose--; and that the said Letters Patent should be read with this correction therein that the same may conform to the record of the case in the Patent Office.

Signed and sealed this 16th day of June, A. D. 1942.

(Seal)

Henry Van Arsdale,
Acting Commissioner of Patents.